United States Patent [19]

Hareyama et al.

[11] Patent Number: 4,854,281

[45] Date of Patent: Aug. 8, 1989

[54] INTERNAL COMBUSTION ENGINE

[75] Inventors: Kisichiro Hareyama; Shokichi Hareyama, both of Iwate Pref., Japan

[73] Assignee: Kabushiki Kaisha Hareyama Giken, Japan

[21] Appl. No.: 146,738

[22] Filed: Jan. 21, 1988

[30] Foreign Application Priority Data

| Jan. 21, 1987 | [JP] | Japan | 62-11982 |
| Jan. 21, 1987 | [JP] | Japan | 62-11983 |
| Jan. 21, 1987 | [JP] | Japan | 62-11984 |
| Jan. 23, 1987 | [JP] | Japan | 62-13682 |
| Nov. 10, 1987 | [JP] | Japan | 62-283934 |

[51] Int. Cl.⁴ .................................. F02B 19/02
[52] U.S. Cl. .................................. 123/292; 123/255
[58] Field of Search ............ 123/254, 255, 292, 143 B

[56] References Cited

U.S. PATENT DOCUMENTS

| 4,300,497 | 11/1981 | Webber | 123/292 X |
| 4,372,264 | 2/1983 | Trucco | 123/292 X |
| 4,401,072 | 8/1983 | Ito et al. | 123/292 |
| 4,424,780 | 1/1984 | Trucco | 123/292 X |

FOREIGN PATENT DOCUMENTS

| 0216027 | 4/1987 | European Pat. Off. . |
| 295088 | 4/1913 | Fed. Rep. of Germany . |
| 2230234 | 1/1974 | Fed. Rep. of Germany . |
| 548967 | 1/1923 | France . |
| 436824 | 10/1935 | United Kingdom . |
| 969501 | 9/1964 | United Kingdom . |

Primary Examiner—Tony M. Argenbright
Attorney, Agent, or Firm—McGlew & Tuttle

[57] ABSTRACT

An internal combustion engine includes a fuel activation chamber disposed near a main combustion chamber and a valve disposed between the fuel activation chamber and the main combustion chamber to open and close therebetween. The valve is opened by movement of a valve body thereof to the fuel activation chamber. Further, there is provided a valve control device which controls to open and close the valve at the ignition timing in a low speed operation and controls to mantain the valve open in a medium and high speed operation.

16 Claims, 6 Drawing Sheets

INTERNAL COMBUSTION ENGINE

FIELD OF THE INVENTION AND RELATED ART STATEMENT

The present invention relates to an internal combustion engine, and more particularly to an internal combustion engine including a fuel activation chamber disposed near a main combustion chamber and a valve disposed between the fuel activation chamber and the main combustion chamber to open and close therebetween.

An internal combustion engine involves, for example as a combustion system of a compression ignition engine, a direct injection type engine, a precombustion type engine, a swirl chamber type engine and an air chamber type engine. However, in any combustion system, since liquid fuel is directly injected into a combustion chamber, the compression ignition combustion may be started before the injected fuel is uniformly mixed with air. In this case, hydrocarbon in imperfect combustion is produced in the combustion chamber and black smoke is exhausted from the compression ignition engine. Accordingly, the combustion efficiency is reduced and air pollution is effected.

Further, since most of the current compression ignition engine are adapted to be ignited with a high compression ratio and in a high temperature, much nitrogen oxide (Nox) is exhausted and air pollution is also effected.

Accordingly, the present inventor has proposed, in view of such circumstances and inconveniences, an internal combustion engine including a fuel activation chamber disposed near a main combustion chamber and a valve disposed between the activation chamber and the main combustion chamber to open and close therebetween (refer to Japanese Patent Application Nos. 61-253194 and 61-277908).

Since the valve of the above internal combustion engine is structured to be opened and closed by movement of a valve body thereof to the main combustion chamber side from a valve seat thereof, there is no large loss due to the flow of fuel from the activation chamber to the main combustion chamber and accordingly the rotational number and the maximum output power of the internal combustion engine could be improved.

However, the present inventor further continued research and development and has developed an internal combustion engine having further enhanced combustion efficiency and improved maximum output power.

OBJECT AND SUMMARY OF THE INVENTION

It is a first object of the present invention to provide an internal combustion engine having further enhanced combustion efficiency and maximum output power.

In order to achieve the above object, the present invention provides an internal combustion engine including a fuel activation chamber disposed near a main combustion chamber and a valve disposed between the fuel activation chamber and the main combustion chamber to open and close therebetween, wherein the valve is structured to be opened by movement of a valve body thereof to the fuel activation chamber side.

Further, in order to achieve the above object, the present invention provides an internal combustion engine including a fuel activation chamber disposed near a main combustion chamber and a valve disposed between the fuel activation chamber and the main combustion chamber to open and close therebetween, wherein the valve is structured to be opened by movement of a valve body thereof to the fuel activation chamber side, and comprising an ignition plug disposed to be exposed in the fuel activation chamber.

Furthermore, in order to achieve the above object, the present invention provides an internal combustion engine including a fuel activation chamber disposed near a main combustion chamber and a valve disposed between the fuel activation chamber and the main combustion chamber to open and close therebetween, wherein the valve is structured to be opened by movement of a valve body thereof to the fuel activation chamber side, and a fuel feeding hole for feeding fuel to the fuel activation chamber and a compressed air introducing hole for feeding compressed air from the main combustion chamber to the fuel activation chamber are joined each other at respective intermediate positions so that the compressed air in the main combustion chamber and the injected fuel from a fuel injection nozzle are premixed to be injected into the fuel activation chamber.

In addition, in order to achieve the above object, the present invention provides an internal combustion engine including a fuel activation chamber disposed near a main combustion chamber and a valve disposed between the fuel activation chamber and the main combustion chamber to open and close therebetween, comprising valve control means for opening and closing the valve at an ignition timing in a low speed operation and maintaining the valve open in a medium and high speed operation.

Moreover, in order to achieve the above object, the present invention provides an internal combustion engine including a fuel activation chamber disposed near a main combustion chamber and a valve disposed between the fuel activation chamber and the main combustion chamber to open and close therebetween, wherein the valve is structured to be opened by movement of a valve body thereof to the fuel activation chamber side, and further comprising valve body adjustment means for shifting the valve body to the radial direction or the axial direction thereof in accordance with an operation condition, a pair of notches formed in the valve body and a valve seat of the valve, respectively, and which are overlapped each other by a proper amount in accordance with the shifted amount of the valve body by the adjustment means, and a compressed air injection hole formed in the valve to inject compressed air in the main combustion chamber into the fuel activation chamber by the overlap of the pair of notches so that the compressed air of an amount in accordance with the operation condition is introduced into the fuel activation chamber through the compressed air injection hole.

Further, it is a second object of the present invention to provide an internal combustion engine which can be manufactured or assembled easily.

In order to achieve the above object, the present invention provides an internal combustion engine including a fuel activation chamber disposed near a main combustion chamber and a valve disposed between the fuel activation chamber and the main combustion chamber to open and close therebetween, comprising a valve body adjusting means for shifting the valve body in a radial direction or an axial direction thereof in accordance with an operation condition, a pair of notches formed in the valve body and a valve seat of the valve, respectively, and which are overlapped each other in accordance with a shifted amount of the valve body by the valve body adjusting means, and a compressed air injection hole formed in the valve by the overlap of the pair of notches to inject the compressed air in the main combustion chamber into the fuel activation chamber so that the compressed air of an amount in accordance with the operation condition is introduced into the fuel activation chamber through the compressed air injection hole.

BRIEF DESCRIPTION OF THE DRAWINGS

FIGS. 1 to 4 illustrate an embodiment of an internal combustion engine according to the present invention, in which

FIGS. 6 to 11 illustrate a further embodiment of an internal combustion engine according to the present invention, in which

DETAILED DESCRIPTION OF PREFERRED EMBODIMENTS

Embodiments of an internal combustion engine according to the present invention will now be described with reference to drawings.

FIGS. 1 to 4 show an embodiment of the present invention.

Figure 1:
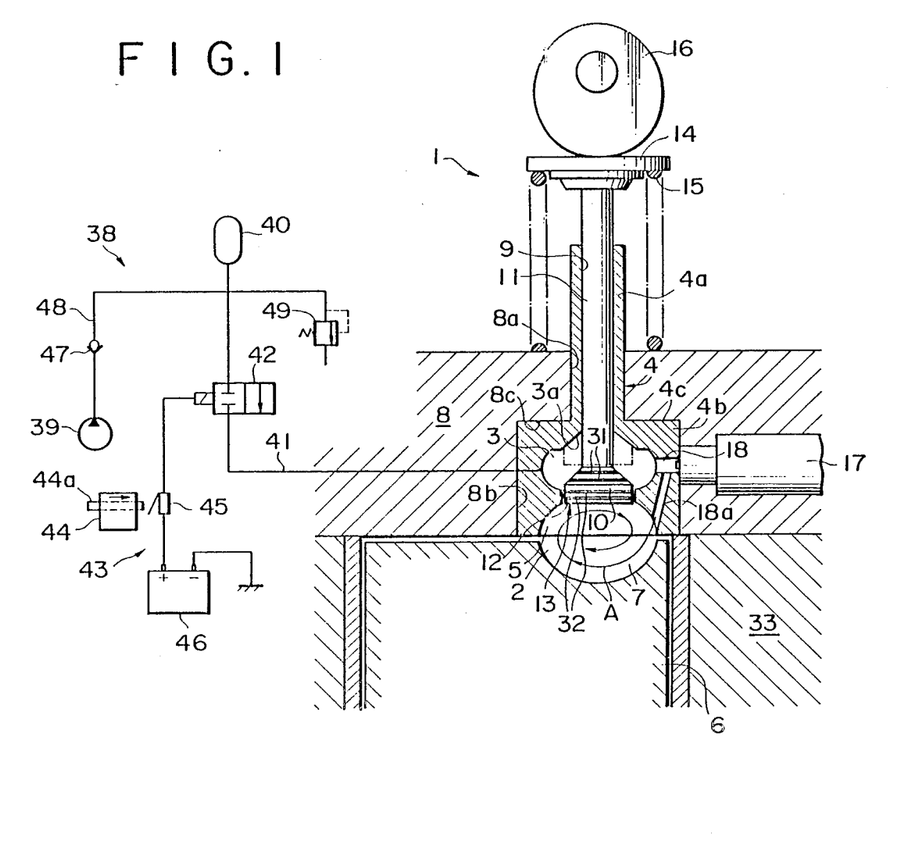
FIG. 1 is a cross-sectional view showing a configuration of the internal combustion engine.

An internal combustion engine 1 of the present embodiment is applied to a compression ignition engine such as a diesel engine.

The internal combustion engine 1 comprises a fuel activation chamber 3 disposed above and near a main combustion chamber 2.

The fuel activation chamber 3 is formed in a lower portion 4b formed with a relatively large diameter of a cylindrical holder 4 having an upper portion 4a formed with a small diameter and a step 4c.

The activation chamber 3 is in the form of a rotary body having a center formed by a vertical axis of the holder 4 and the upper portion 3a thereof is formed in a conical shape.

The holder 4 includes a substantially semispherical cavity 5 formed at a bottom thereof with an opening directed downward and which communicates with the fuel activation chamber 3.

The cavity 5 of the holder 4 is opposed to a substantially semispherical cavity 7 formed in an upper portion of a piston 6 with an opening directed upward.

The main combustion chamber 2 is formed into a substantially spherical shape apt to produce a swirl A by the cavities 5 and 7 when the piston 6 is at the top dead point for compression.

A communicating hole 9 extending in the axial direction of the holder 4 is formed in the upper portion 4a of the holder 4. A rod 11 having a valve body 10 at the lower portion thereof is inserted into the hole 9 to seal between the holder 4 and the rod 11.

The valve body 10 can be fitted in a valve seat 12 formed in the holder 4 between the fuel activation chamber 3 and the cavity 5 and forms a valve 13 together with the valve seat 12.

A tappet 14 is fixedly mounted oon the upper end of the rod 11 and a spring 15 is disposed between the tappet 14 and a cylinder head 8.

The valve body 10 is always urged to move upward by the resilience of the spring 15 so that the tappet 14 abuts against a cam 16. Thus, when the cam 16 is rotated, the valve body 10 is moved up and down.

The motive power of a crank shaft not shown is transmitted to the cam 16 through a proper power transmission device to rotate the cam 16 at a predetermined timing.

Accordingly, the valve 13 is opened and closed in response to the rotation of the cam 16 at a predetermined timing.

It is preferable that the open period of the valve 13 is set to a proper period between around the end of the compression stroke and around the beginning of the exhaust stroke, while it is not limited thereto. For example, the open period of the valve 13 may be set to a long period between around the end of the compression stroke and around the end of the induction stroke.

The valve 13 is preferably constructed so that the open timing thereof precedes in accordance with the rotational speed of the internal combustion engine. A preceding device can be easily structured using a conventional technique and provide in the above-mentioned power transmission device and accordingly detailed description thereof is omitted.

A fuel feeding hole 18 which feeds injected fuel from a fuel injection nozzle 17 into the fuel activation chamber 3 is formed in a side portion of the holder 4.

Figure 2:
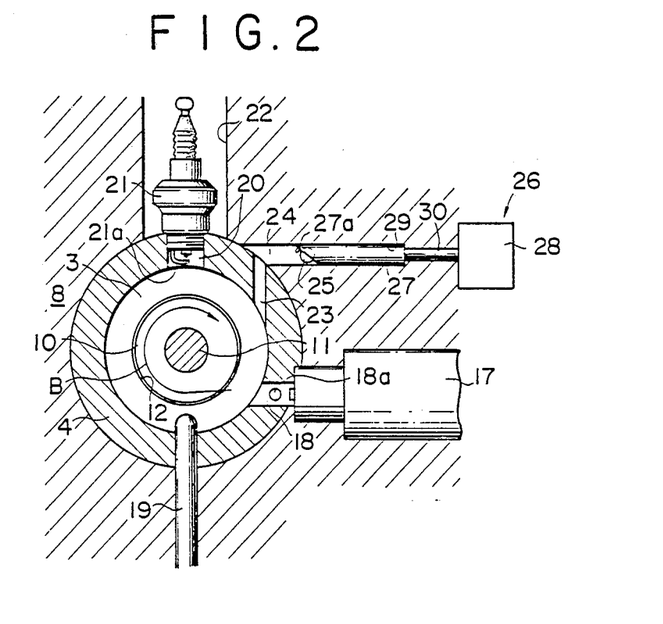
FIG. 2 is an enlarged cross-sectional view showing part of the internal combustion engine.

The fuel feeding hole 18 is preferably formed eccentrically with respect to the fuel activation chamber 3 (refer to FIG. 2) so that the injected fuel from the fuel injection nozzle 17 forms a clockwise swirl B in FIG. 2. The swirl B facilitates the activation of the fuel.

Further, the fuel feeding hole 18 and the cavity 5 of the holder 4 communicate with each other through a compressed air introducing hole 18a having a small diameter. The compressed air introducing hole 18a is to introduce the compressed air in the main combustion chamber 2 into the fuel feeding hole 18. The compressed air from the compressed air introducing hole 18a is premixed with the injected fuel from the fuel injection nozzle 17 and the mixture of the compressed air and the injected fuel is injected into the fuel activation chamber 3.

Thus, since the fuel feeding hole 18 serves to premix the fuel and the compressed air and feed the mixture thereof into the fuel activation chamber 3, the fuel feeding hole 18 forms a so-called premixing port for the fuel activation chamber 3.

Further, an end of a glow plug 19 is slightly protruded in the fuel activation chamber 3. It is preferable that the glow plug 19 is disposed slightly downstream of the hole 18 in the direction of fuel injection from the hole 18.

An internal thread 20 is formed in the holder 4 in opposing relationship with the fuel feeding hole 18. An ignition plug 21 is tightly fitted into the internal thread 20. An end 21a of the ignition plug 21 is disposed within the internal thread 20 so that the swirl B in the fuel activation chamber 3 is not prevented, while it is a matter of course that the end 21a may be protruded into the chamber 3 from the internal thread 20.

The ignition plug 21 is detachably fixed to the internal thread 20 through a hole 22 formed in the cylinder head 8 corresponding to the internal thread 20 of the holder 4.

The holder 4 is further formed with another hole 23 and the cylinder head 8 is formed with holes 24 and 25 corresponding to the hole 23 of the holder 4. The hole 23 is formed so that the hole 23 is directed downstream of the swirl B in the fuel activation chamber 3. The hole 24 communicates with the main combustion chamber 2 through the hole 25. Accordingly, the fuel activation chamber 3 communicates with the main combustion chamber 2 through the holes 23, 24 and 25.

An air quantity adjusting device 26 which is structured to change an aperture volume of the hole 25 with respect to the hole 24 is disposed between the holes 24 and 25.

The air quantity adjusting device 26 comprises a small cylindrical rod 27 having an inclined portion 27a formed an end thereof and a rotating device 28 which rotates the rod.

The small rod 27 is configured so that the inclined portion 27a thereof is disposed at an inlet of the hole 25. The rod 27 is rotatably mounted into a hole 29 formed in the cylinder head 8 and coupled with the rotating device 28 through a connecting rod 30.

The air quantity adjusting device 26 is provided to detect a high speed operation, an acceleration operation and/or a heavily loaded operation of the engine and to supplement a quantity of compressed air fed from the main combustion chamber 2 to the fuel activation chamber 3 through the compressed air introducing hole 18a. In adjustment, the small rod 27 is angularly moved to adjust the open area formed by overlap of the inclined portion 27a and the hole 25 so that the quantity of compressed air flowing through the holes 25, 24 and 23 is adjusted.

The rotating device 28 rotates the small rod 27 by a proper amount on the basis of, for example, a rotational number of a crank shaft not shown, a moved amount of an accelerator pedal, a degree of a variation of the moved amount of the accelerator pedal, a degree of a variation of flow velocity at downstream of a throttle valve in an intake pipe not shown or the like.

The rotating device 28 may include a processing unit such as a microcoomputer for processing detection data obtained by detecting the various variations described above, a stepping motor driven on the basis of the processed result of the processing unit, and a reduction device for the stepping motor. Alternatively, the rotating device 28 may be configured to be mechanically coupled with a throttle valve or an accelerator pedal through connecting means not shown in a link manner. The configuration of the rotating device 28 may be determined in consideration of the application and object of the internal combustion engine.

Figure 3:
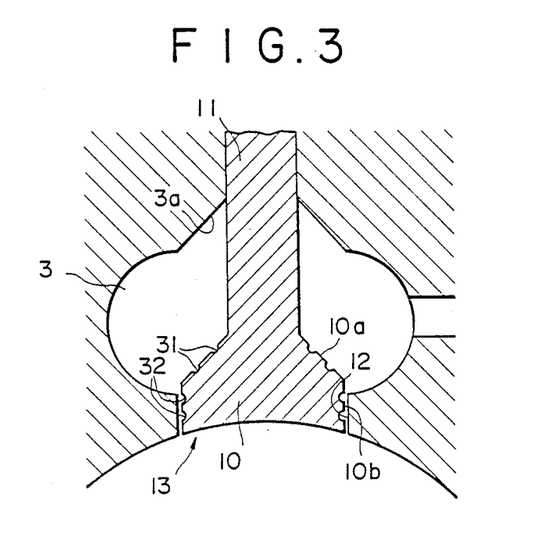
FIG. 3 is an enlarged cross-sectional view showing part of the internal combustion engine and FIG. 4 is a plan view showing a configuration of a piston of the internal combustion engine.

Two annular grooves 31 are formed in an upper surface 10a of the valve body 10 and further two annular grooves 32 are formed in a side periphery 10b of the valve body 10b. The number of the grooves 31 and 32 are not limited thereto. When the valve 13 is operated, carbon attached to the upper surface 10a of the valve body 10 and/or a ceiling surface 3a of the fuel activation chamber 3 is removed effectively and carbon attached to the side periphery 10b of the valve body 10 and/or the valve seat 12 is also removed effectively. Particularly, since carbon between the upper surface 10a of the valve body 10 and the ceiling surface 3a can be removed, a seal between the valve body 10 and the cylinder head 8 can be always maintained to a good state when the valve body 10 is moved up.

The holder 4 includes the step 4c formed between the upper portion 4a and the lower portion 4b as described above. The cylinder head 8 is formed with a hole 8a having a small diameter and a hole 8b having a large diameter in corresponding relationship with the shape of the holder 4 and an annular step 8c is formed between the holes 8a and 8b.

In the embodiment, a part of the hole 8b is overlapped on a cylinder liner 34 which is fixed to an inner periphery of a cylinder block 33 and the hole 8b is formed much eccentrically to the main combustion chamber 2.

The holder 4 is mounted in the cylinder head 8 as follows.

The holder 4 is forcedly inserted into the holes 8a and 8b of the cylinder head 8 from the lower part thereof and is integrally fixed to the cylinder head 8. At this time, the step 4c of the holder 4 is brought into close contact with the step 8c of the cylinder head 8. Then, the cylinder head is fixed to the cylinder block 33. The holder 4 is completely fixed by restricting its movement in the vertical direction by the step 8c of the cylinder head 8 pressing the step 4c and an upper end surface 34a of the liner 34 pressing part of a bottom 4d of the holder 4.

Further, it is preferable that the holder 4 is fixed to the cylinder head 8 and is not rotated with respect to the cylinder head 8 by a key, not shown, which is formed at any position to prevent the holder 4 from rotating, while in the case where the holder 4 is formed in a nonrotatable body with respect to an axis thereof, the key is not necessary since the holder 4 is not rotated with respect to the cylinder head 8.

Further, it is a matter of course that a part of the bottom 4d of the holder 4 extends over the liner 34 greatly to reach the cylinder block 33 so that the holder 4 is fixed.

Figure 4:
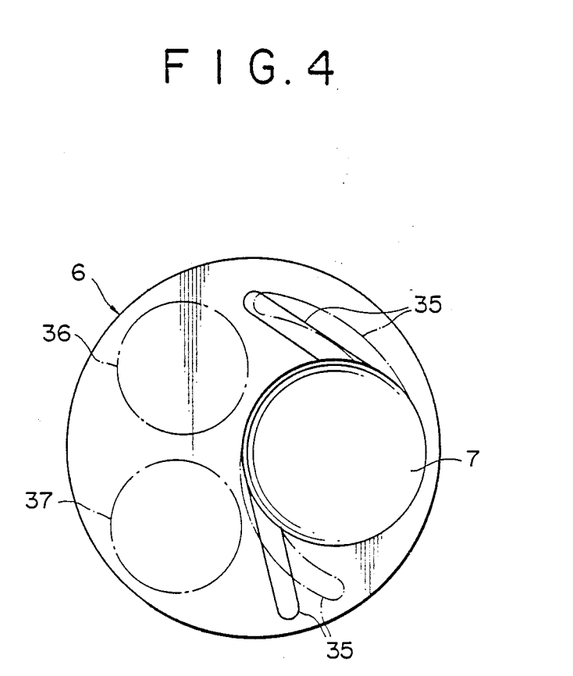

In the embodiment, the piston 6 is formed with two guide grooves 35 extending from the cavity 7 of the piston 6 straight or curvedly. The number of the guide grooves 35 is not limited thereto. The grooves 35 are provided to form a swirl of air in the main combustion chamber 2 effectively in the compression stroke. Accordingly, when the guide grooves 35 are formed in a curvature, it is preferable that the curved line of the grooves 35 is identical with the direction of the swirl. In FIG. 4, circles 36 and 37 in the piston 6 shown by one-dot chain line indicate positions of an intake valve and an exhaust valve not shown provided in the cylinder head 8 with respect to the piston 6.

Operation of the embodiment is now made.

Assuming that the internal combustion engine 1 is in the compression stroke, air in the main combustion chamber 2 is compressed. The compressed air in the main combustion chamber 2 is injected into the fuel feeding hole 18 through the compressed air introducing hole 18a and is further guided in the fuel activation chamber 3 from the fuel feeding hole 18. At this time, fuel is injected into the fuel feeding hole 18 from the fuel injection nozzle 17. The injected fuel is premixed with the compressed air in the fuel feeding hole 18 fed from the main combustion chamber 2 through the compressed air introducing hole 18a and the mixture thereof is injected into the fuel activation chamber 3. The swirl B of the fuel-and-air mixture is formed in the fuel activation chamber 3 by the injection thereof and the mixture is heated by the glow plug 19 to facilitate the activation of the mixture so that the mixture is formed uniformly.

Then, near the top dead point for the compression, the valve body 10 is moved up and the valve 13 is opened by the rotation of the cam 16 and the resilience of the spring 15. In connection with this operation, the ignition plug 21 produces a spark at a predetermined ignition timing. The mixture in the fuel activation chamber 3 is mixed with the compressed air in the main combustion chamber 2 by the opening of the valve 13 and begins to be ignited and burned. Further, the mixture is exactly ignited by the spark of the ignition plug 19. The mixture in the fuel activation chamber 3 begins to be burned and the pressure thereof in the chamber 3 is suddenly enhanced, so that the mixture is injected through the space between the valve body 10 and the valve seat 12 and the holes 18 and 18a into the main combustion chamber 2. At this time, the injected mixture in combustion from the hole 18a forms a strong swirl in the main combustion chamber 2. The mixture in the main combustion chamber 2 is smoothly burned by this swirl.

As described above, when the valve 13 is opened and the mixture begins to be burned, the valve body 10 abuts against the ceiling surface 3a to seal between the valve body and the cylinder head 8. The seal prevents the mixture in the fuel activation chamber 3 from leaking out from the gap between the holder 4 and the valve body 10 to the outside.

Thereafter, the valve 13 is closed at a proper time, for example, near the end of the expansion stroke or near the end of the exhaust stroke. The same operation as described above is then repeated.

The internal combustion engine 1 in the embodiment may further comprise, in place of the air adjusting device 26 or together with this device, a compressed air feeding device 38 which feeds the compressed air into the fuel combustion chamber 3 upon acceleration of the internal combustion engine.

The compressed air feeding device 38 can be composed of, for example as shown in FIG. 1, a pump 39 which compresses part of fresh air obtained through an air cleaner, a tank 40 which stores air compressed by the pump, a conduit 41 which guides the compressed air from the tank to the fuel activation chamber 3, a normally closed electromagnetic valve 42 disposed in the conduit 41, and a controller 43 which controls to open and close the electromagnetic valve 42.

The pump 39 is driven by the motive power of a crank shaft not shown.

The controller 43 detects the acceleration state or the loaded state of the internal combustion engine to open the electromagnetic valve 42 so that the compressed air is fed to the fuel activation chamber 3.

In the embodiment, large movement in one direction of a control rack 44a of a fuel feeding pump 44 in the acceleration state or the loaded state of the engine is utilized to press an actuator of a switch 45 by the movement of the control rack 44a and open the switch, whereby an operating current flows from a battery 46 through the switch 45 to the electromagnetic valve 42.

Reference numeral 47 denotes a check valve disposed in the conduit 48 so that the compressed air does not flow reversely from the tank 40 to the pump 39, and 49 denotes a relief valve which maintains the pressure in the tank 40 to be constant.

When the compressed air feeding device 38 is provided, the compressed air may be directly fed to the fuel activation chamber 3 as shown in FIG. 1, while the compressed air may be fed to be injected in the same direction as that of the swirl B and in the tangential direction of the swirl B in the fuel activation chamber 3, that is, the compressed air may be fed, for example, from the hole 23 or the fuel feeding hole 18 or from any position between the hole 23 and the fuel feeding hole 18.

The characteristic operation and effect of the internal combustion engine according to the present invention are summarized as follows.

(1) Preactivation of injected fuel

The fuel is relatively early injected from the fuel injection nozzle 17 into the fuel activation chamber 3 having remaining gas of a high temperature contained therein and a wall surface heated to a high temperature and is premixed with the compressed air injected from the compressed air introducing hole 18a. Further, the injected and premixed fuel forms the swirl in the fuel activation chamber 3 and forcedly preheated by the remaining gas, the high-temperature wall surface, the glow plug 19 and the like so that uniform mixture is formed. In this connection, when the compressed air introducing hole 18a is too large, the fuel is self-ignited in the fuel activation chamber 3 in the same manner as the so-called diesel combustion and accordingly the diameter of the compressed air introducing hole 18a is preferably set to a relatively small value.

(2) Control of ignition timing by valve 13

The uniformly activated (premixed and preheated) mixture existing between the valve body 10 and the ceiling surface 3a of the fuel activation chamber 3 is subjected to the squish operation between the upper surface 10a of the valve body 10 and the ceiling surface 3a of the fuel activation chamber 3, when the valve body 10 is moved up, to be injected strongly from the opened valve 13 into the main combustion chamber 2 and is brought into contact with fresh air in the main combustion chamber to be immediately ignited and burned. In this manner, since the internal combustion engine of the present invention effects the ignition and combustion by opening of the valve 13 without the spark ignition of the ignition plug 21 essentially, the ignition plug 21 may be removed. Furhter, utilization of the ignition plug 21 can exactly ignite fuel which is hard to be activated and ignited at a predetermined timing. Accordingly, utilization of the ignition plug 21 may be determined in consideration of the kind and property of fuel and application of the internal combustion engine.

As apparent from the foregoing, the internal combustion engine of the present invention can select and change the open and close timing of the valve 13 and/or the spark time of the ignition plug 21 so that the ignition timing can be controlled in optimum. When a spark of the ignition plug 21 is used to ignite the mixture, the timing of producing the spark from the plug 21 may be synchronized with the opening timing of the valve 13.

Further, since the open and close timing of the valve 10 can be controlled, the feeding time of fuel can be also controlled and the fuel and air are premixed and preheated sufficiently to be activated in the fuel activation chamber 3. Accordingly, various gases can be gasified to optimum states suitable for various internal combustion engines.

Thus, various fuel can be employed and the present invention can be applied to the whole internal combustion engine (not limited to the diesel engine and including the general petrol engine).

(3) Premix combustion by activation

The fuel is previously activated in the fuel activation chamber 3 before ignition and accordingly there is no diesel knocking particular to the diesel combustion. A quiet premix combustion can be achieved with less exhaust gas and particularly black smoke is not almost produced. Accordingly, since the engine can be operated at a high speed rotation and the compression ratio thereof can be reduced slightly, the weight of the engine can be reduced. Further, the excess coefficient can approach 1.0 and accordingly the output power of the engine can be improved.

In the present invention, the holder 4 may disposed at the middle with respect to the piston 6.

The shape of the cavity 7 of the piston 6 is not limited to a substantially semispherical shape and may be any shape such as a substantially cylindrical shape.

Furthermore, any one or ones of the grooves 31 and 32 of the valve body 10, the air quantity adjustng device 26, the groove 35 of the piston 6 and the compressed air feeding device 38 may be removed and may be provided selectively in consideration of application of the internal combustion engine 1.

In addition, since the wall surface of the fuel activation chamber 3 or the whole of the holder 4 is formed of ceramic material, it is preferable that the thermal efficiency of the internal combustion engine can be improved. It is a matter of course that the whole of the engine may be formed of ceramic material together with the cylinder block 8 and the cylinder block 33.

In the embodiment, while it is configured that the main combustion chamber 2 communicates with the halfway position of the fuel feeding hole 18 through the compressed air introducing hole 18a, the present invention is not limited thereto and it may be configured that the halfway positions of the respective holes are joined with each other.

Figure 5:
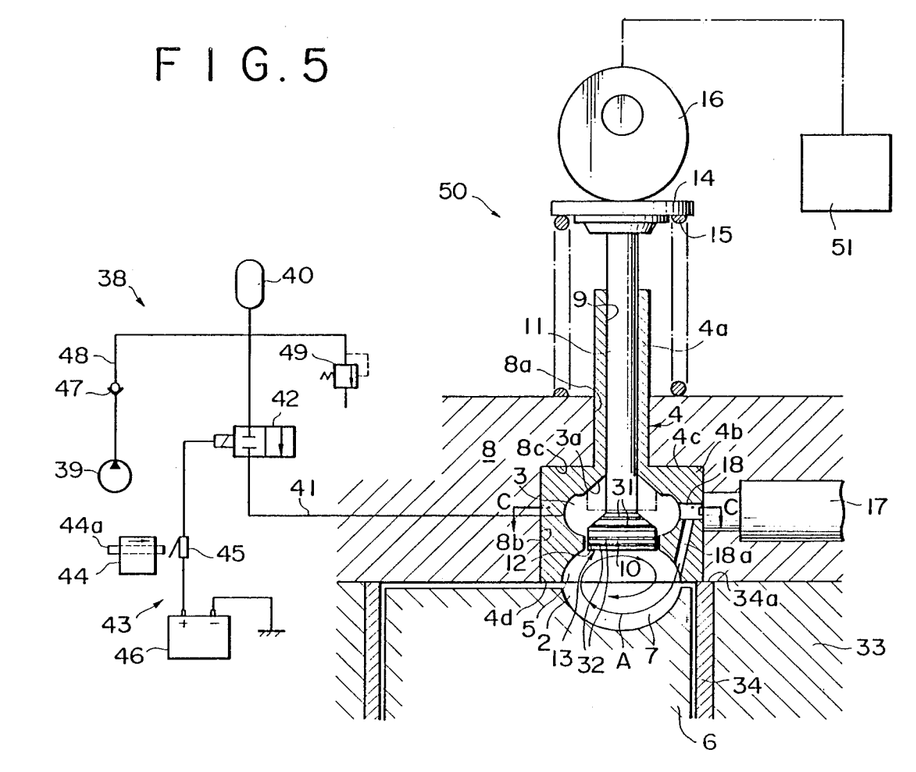
FIG. 5 is a cross-sectional view showing another embodiment of an internal combustion engine according to the present invention.

FIG. 5 shows another embodiment of the present invention. The like elements having the same function as that of the elements of FIGS. 1 to 4 are designated by like reference numerals and description thereof is omitted.

An internal combustion engine 50 of the embodiment shown in FIG. 5 comprises the substantially same configuration as that of the engine 1 of the embodiment shown in FIG. 1 except that there is provided a valve control device 51 which opens and closes the valve 13 at an ignition timing in a low speed operation and maintains the valve 13 open at a medium and high speed operation. Description with respect to the same configuration as that of the engine 1 quotes the description of the embodiment of FIGS. 1 to 4, and only the valve control device 51 different from the embodiment of FIGS. 1 to 4 is now described.

The valve control device 51 is a mechanism which detects the rotational number of the engine and stops the operation of the cam 16 to open the valve 13 when the rotational number reaches a medium speed. Such a mechanism can be easily configured by a controller using a hitherto known speed detection sensor, a microcomputer and the like and accordingly detailed description thereof is omitted. The mechanism of the valve control device 51 is not limited to a special configuration and may be any configuration as far as the valve 13 can be maintained in the open state at the medium and high speed operation.

The medium speed of the valve control device 51 in the embodiment is preferably set within the range of 1500 to 2000 rpm, while it is not limited thereto and it may be determined in consideration of the type, performance and application of the engine to which the present invention is applied.

FIGS. 6 to 9 show a still another embodiment of the present invention.

Figure 6:
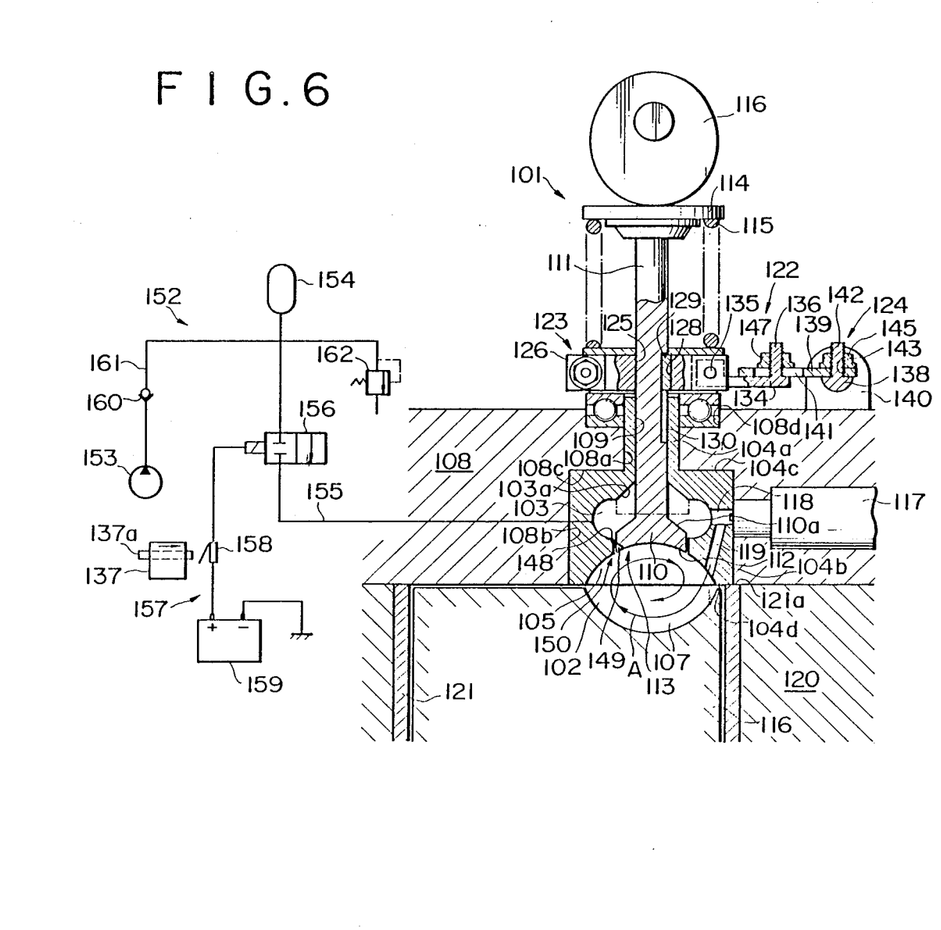
FIG. 6 is a cross-sectional view showing a configuration of the internal combustion engine.

An internal combustion engine 101 of the present embodiment illustrates the case where the present invention is applied to a compression ignition engine such as the diesel engine.

The internal combustion engine 101 comprises a fuel activation chamber 103 disposed above and near a main combustion chamber 102.

The fuel activation chamber 103 is formed in a lower portion 104b formed with a relatively large diameter of a cylindrical holder 104 having an upper portion 104a formed with a small diameter and a step 104c.

The activation chamber 103 is in the form of a rotary body having a center formed by a vertical axis of the holder 104 and the upper portion thereof is formed in a conical shape.

The holder 104 includes a substantially semispherical cavity 105 formed under the fuel activation chamber 103 with an opening directed downward.

The cavity 105 of the holder 104 is opposed to a substantially semispherical cavity 107 formed in an upper portion of a piston 106 with an opening directed upward.

The main combustion chamber 102 is formed in a substantially spherical shape apt to produce a swirl A by the cavities 105 and 107 except a plane portion between the piston and the cylinder head 108 when the piston 106 is at the top dead point for compression.

A communicating hole 109 extending in the axial direction of the holder 104 is formed in the upper portion 104a of the holder 104.

A rod 111 having a valve body 110 at the lower portion thereof is slidably inserted into the hole 109 to seal between the holder 104 and the rod 111.

The valve body 110 forms a valve 113 together with a valve seat 112 formed in the holder 104 between the fuel activation chamber 103 and the cavity 105.

A spring 115 is disposed between the tappet 114 which is fixedly mounted on the upper end of the rod 111 and a cylinder head 108.

The valve body 110 is always urged to move upward by the resilience of the spring 115 and is moved up and down in response to the rotation of the cam 116 which abuts against the tappet 114.

The motive power of a crank shaft not shown is transmitted to the cam 116 through a power transmission device not shown to rotate the cam 116 at a predetermined timing.

Accordingly, the valve 13 is opened and closed in response to the rotation of the cam 16 at a predetermined timing.

It is preferable that the open period of the valve 113 is set to a proper period between around the end of the compression stroke and around the beginning of the exhaust stroke, while it is not limited thereto. For example, the open period of the valve 113 may be set to a long period between around the end of the compression stroke and around the end of the induction stroke.

The valve 113 is preferably constructed so that the open timing thereof precedes in response to the rotational speed of the internal combustion engine. A preceding device can be easily structured using a conventional technique and provide in the above-mentioned power transmission device and accordingly detailed description thereof is omitted.

A fuel feeding hole 118 which feeds injected fuel from a fuel injection nozzle 117 into the fuel activation chamber 103 is formed in a side portion of the holder 104.

The fuel feeding hole 118 is preferably formed eccentrically to the fuel activation chamber 103 so that the injected fuel from the fuel injection nozzle 117 forms a swirl in the fuel activation chamber 103. The swirl B facilitates the activation of the fuel.

Further, the fuel feeding hole 118 and the cavity 105 of the holder 104 communicate with each other through a compressed air introducing hole 119 having a small diameter. The compressed air introducing hole 119 is to introduce the compressed air in the main combustion chamber 102 into the fuel feeding hole 118. The compressed air from the compressed air introducing hole 119 is premixed with the injected fuel from the fuel injection nozzle 117 and the mixture of the compressed air and the injected fuel is injected into the fuel activation chamber 103.

Thus, since the fuel feeding hole 118 serves to premix the fuel and the compressed air and feed the mixture thereof into the fuel activation chamber 103, the fuel feeding hole 118 forms a so-called premixing port for the fuel activation chamber 103.

Further, an end of a glow plug (not shown) is slightly protruded in the fuel activation chamber 103. It is preferable that the glow plug is disposed slightly downstream of the hole 118 in the direction of fuel injection from the hole 118.

The holder 104 includes the step 104c formed between the upper portion 104a and the lower portion 104b as described above. The cylinder head 108 is formed with a hole 108a having a small diameter and a hole 108b having a large diameter in corresponding relationship with the shape of the holder 104 and an annular step 108c is formed between the holes 108a and 108b.

In the embodiment, a part of the hole 108b is overlapped on a cylinder liner 134 which is fixed to an inner periphery of a cylinder block 120 and the hole 108b is formed much eccentrically to the main combustion chamber 102.

The holder 104 is mounted in the cylinder head 108 as follows.

The holder 104 is forcedly inserted into the holes 108a and 108b of the cylinder head 108 from the lower part thereof and is integrally fixed to the cylinder head 108. At this time, the step 104c of the holder 104 is brought into close contact with the step 108c of the cylinder head 108. Then, the cylinder head is fixed to the cylinder block 133. The holder 104 is completely fixed by restricting its movement in the vertical direction by the step 108c of the cylinder head 108 pressing the step 104c and an upper end surface 121a of the liner 121 pressing part of a bottom 104d of the holder 104.

Further, it is preferable that the holder 104 is fixed to the cylinder head 108 and is not rotated with respect to the cylinder head 108 by a key, not shown, which is formed at any position to prevent the holder 104 from rotating, while in the case where the holder 104 is formed in a nonrotatable body with respect to an axis thereof, the key is not necessary since the holder 104 is not rotated with respect to the cylinder head 108.

Further, it is a matter of course that a part of the bottom 104d of the holder 104 extends over the liner 134 greatly to reach the cylinder block 133 so that the holder 104 is fixed.

The internal combustion engine comprises a valve body adjusting device 122 disposed between the spring 115 and the cylinder head 108.

Figure 7:
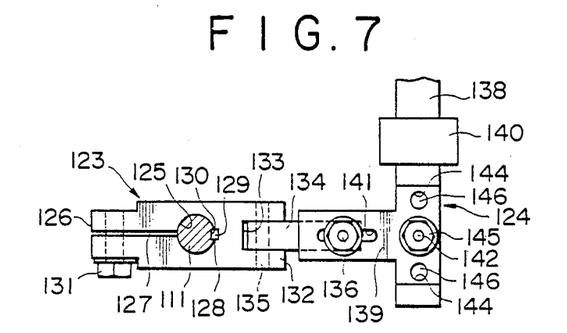
FIG. 7 is a partially cross-sectional enlarged plan view showing part of the internal combustion engine.

The valve body adjusting device 122 includes a block 123 attached to the rod 111 and a rotating device 124 which operates to rotate the block.

The block 123 is formed at the center thereof with a hole 125 to which the rod 111 is inserted. Furhter, an end portion 126 of the block 123 is divided by a slit 127 formed from the hole 125 and extending outward. A keyway 128 extending vertically is formed in the hole 125 in opposing relationship with the slit 127 and a key 129 is fitted into the keyway.

On the other hand, the rod 111 is formed at the substantially center portion thereof with a groove 130 extending in the axial direction of the rod 111.

Part of the key 129 of the block 123 is engaged with the groove 130 of the rod 111. The rod 111 is supported to the block 123 in the axial direction thereof unrotatably through the key 129.

A bolt 131 is provided across the slit 127 at the end portion 126 of the block 123.

The bolt 131 can be adjusted to change a width of the slit 127 so that the block 123 can be tightly mounted to the rod 111 without shake.

The other end portion 132 of the block 123 is forked into two branches by a recess 133. An extending member 134 is rotatably mounted at one end thereof in the recess 133 by a pin 135.

A stud bolt 136 is mounted to the other end of the extending member 134.

The rotating device 124 includes a T-shaped shift member 139 mounted to a reciprocating member 138 which operates in interlocked relationship with a control rack 137a of a fuel injection pump 137.

The reciprocating member 138 is slidably supported in the perpendicular direction to the axial direction of the rod 111 by a block 140 provided on the cylinder head 108.

An elongated hole 141 extending in the perpendicular direction to the moving direction of the reciprocating member 138 is formed in one end of the shift member 139. A hole 143 to which a stud bolt 142 mounted on the reciprocating member 138 is inserted and holes 144 disposed at both sides of the hole 143 are formed in the other end of the shift member 139.

The shift member 139 is fixed to the reciprocating member 138 by the stud bolt 142 of the member 138 inserted into the hole 143 and a nut 145. Projections 146 protruded on both sides of the stud bolt 142 of the reciprocating member 138 are inserted into the holes 144 of the shift member 139 and accordingly the shift member 139 is provided to the reciprocating member 138 without shake.

The stud bolt 136 of the extending member 134 is inserted into the elongated hole 141 of the shift member 139. The shift member 139 is prevented from jumping from the extending member 134 during operation by the stud bolt 136 and a nut 147 screwed tightly.

Figure 8:
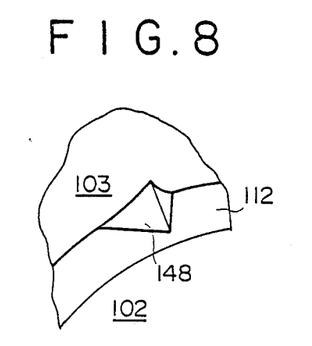
FIG. 8 is an enlarged perspective view showing part of a valve seat of the internal combustion engine.
Figure 9:
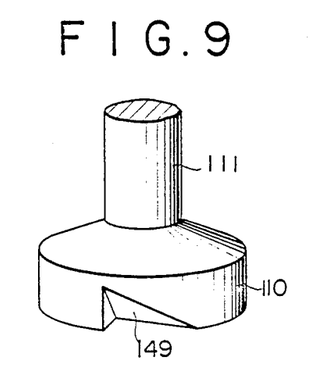
FIG. 9 is an enlarged perspective view showing part of the internal combustion engine.

Further, notches 148 and 149 in the form of wedge are formed in part of the periphery of the valve seat 112 and the valve body 110 as shown in FIGS. 8 and 9. The notch 148 is formed with an opening thereof being directed upward and the notch 149 is formed with an opening thereof being directed downward in the opposed manner to the notch 148.

Figure 10:
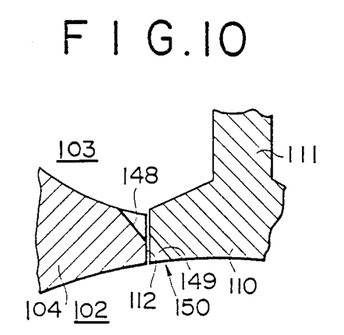
FIG. 10 is an enlarged cross-section view showing part of the internal combustion engine.

Accordingly, when the notches 148 and 149 are overlapped with each other, a compressed air injection hole 150 is formed in the valve 113 as shown in FIG. 10. In the normal state, the compressed air injection hole 150 is not formed.

The block 123 is forcibly fixed to a thrust bearing 151 fitted into recess 108d formed in the cylinder head 108 by the spring 115. Thus, the block 123 is supported to the cylinder head 108 rotatably about the rod 111.

The internal combustion engine 101 can additionally provide a compressed air feeding device 152 which feeds the compressed air into the fuel activation chamber 103 in the acceleration state of the engine.

The compressed air feeding device 152 can include, for example as shown in FIG. 6, a pump 153 which compresses part of fresh air obtained through an air cleaner, a tank 154 which stores air compressed by the pump, a conduit 155 which leads the compressed air from the tank to the fuel activation chamber 103, a normally closed electromagnetic valve 156 disposed in the conduit 155, and a controller 157 which controls to open and close the electromagnetic valve 156.

The pump 153 is driven by transmitting motive power of a crank shaft not shown.

The controller 157 operates to open the electromagnetic valve 156 and feed the compressed air to the fuel activation chamber 103 in the acceleration state or the loaded state of the engine.

In the embodiment, large movement in one direction of the control rack 137a of the fuel feeding pump 137 in the acceleration state or the loaded state of the engine is utilized to press an actuator of the switch 158 by the movement of the control rack 137a so that the switch 158 is closed and an operating current flows from the battery 59 through the switch 158 to the electromagnetic valve 156.

Reference numeral 160 denotes a check valve disposed in the conduit 161 connecting between the pump 153 and the tank 154 so that the compressed air does not flow reversely from the tank 154 to the pump 153, and reference numeral 162 denotes a relief valve which maintains the pressure in the tank 154 to be constant.

When the compressed air feeding device 152 is provided, the compressed air may be directly fed to the fuel activation chamber 103 as shown in FIG. 6, while the compressed air may be fed to be injected in the same direction as that of the swirl produced in the fuel activation chamber 103.

Operation of the embodiment is now described.

When the internal combustion engine 101 is in the compression stroke in the normal operation state, air in the main combustion chamber 102 is compressed. The compressed air in the main combustion chamber 102 is injected into the fuel feeding hole 118 through the compressed air introducing hole 119 and is further guided in the fuel activation chamber 103 from the fuel feeding hole. At this time, fuel is injected into the fuel feeding hole 118 from the fuel injection nozzle 108. The injected fuel is premixed with the compressed air in the fuel feeding hole 118 fed from the main combustion chamber 102 through the compressed air introducing hole 119 and the mixture thereof is injected into the fuel activation chamber 103. The swirl of the fuel-and-air mixture is formed in the fuel activation chamber 103 by the injection thereof and the activation of the injected fuel is facilitated. In this connection, the injected fuel is heated by a glow plug not shown to facilitate the activation of the mixture so that the mixture is formed uniformly.

Then, near the top dead point for the compression stroke, the valve body 110 is moved up and the valve 13 is opened by the rotation of the cam 116. The mixture in the fuel activation chamber 103 is mixed with the compressed air in the main combustion chamber 102 by the opening of the valve 10 and begins to be ignited. The mixture in the fuel activation chamber 103 begins to be burned in response to the ignition and the pressure thereof in the chamber 103 is suddenly enhanced, so that the mixture is injected through the space between the valve body 110 and the valve seat 112 and the holes 118 and 119 into the main combustion chamber 102. At this time, the injected mixture in combustion from the hole 119 forms a strong swirl in the main combustion chamber 102. The combustion in the main combustion chamber 102 is made smoothly by this swirl.

As described above, when the valve 113 is opened and the mixture begins to be burned, the valve body 110 abuts against the ceiling surface 103a to seal between the valve body and teh cylinder head 108. The seal prevents the mixture in the fuel activation chamber 103 from leaking out from the gap between the holder 4 and the cylinder head 108 to the outside.

Thereafter, the valve 113 is closed at a proper time, for example, near the end of the expansion stroke or near the end of the exhaust stroke. The same operation as described above is then repeated.

When the operation of the engine is changed from the normal operation state as described above to the acceleration state or the heavily loaded state, the control rack 138 is moved. The movement of the rack 138 is transmitted to the extending member 134 through the shift member 139 to angularly move the block 123. The angular movement of the block 123 is transmitted to the rod 111 through the key 129 to angularly move the rod 111.

The angular movement shifts the valve body 110 in the circumferential direction with respect to the valve seat 112 to overlap the notches 148 and 149 partially so that the compressed air injection hole 150 is formed.

The cross-section of the compressed air injection hole 150 is varied by the overlapped amount of the notches 148 and 149 automatically.

When the engine enters into the compression stroke in the state where the compressed air injection hole 150 is formed, the compressed air in the main combustion chamber 102 is fed into the fuel activation chamber 103 through the compressed air injection hole 150 is complement insufficient compressed air from only the hole 19.

Accordingly, even if a large quantity of fuel is injected in the acceleration state or the heavily loaded state of the engine, the sufficient compressed air corresponding to the large quantity of injected fuel can be fed into the fuel activation chamber 103 to maintain the combustion state satisfactory.

The characteristic operation and effects of the internal combustion engine according to the present invention are summarized as follows.

(1) Preactivation of injected fuel

The fuel is relatively early injected from the fuel injection nozzle 117 into the fuel activation chamber 103 having remaining gas of a high temperature contained therein and a wall surface heated to a high temperature and is premixed with the compressed air injected from the compressed air introducing hole 119. Further, the injected and premixed fuel forms the swirl in the fuel activation chamber 103 and forcedly preheated by the remaining gas, the high-temperature wall surface, the glow plug and the like so that uniform mixture is formed. In this connection, when the compressed air introducing hole 119 is too large, the fuel is self-ignited in the fuel activation chamber 103 in the same manner as the so-called diesel combustion and accordingly the diameter of the compressed air introducing hole 119 is preferably set to a relatively small value.

(2) Control of ignition timing by valve 104

The uniformly activated (premixed and preheated) mixture existing between the valve body 110 of the valve 113 provided near the fuel activation chamber 103 and the ceiling surface 103a of the fuel activation chamber 3 is subjected to the squish operation between the upper surface 110a of the valve body 110 and the ceiling surface 103a of the fuel activation chamber 103 when the valve body 110 is moved up to be injected strongly from the opened valve 113 to the main cmbustion chamber 102 and is brought into contact with fresh air in the main combustion chamber to be immediately ignited and burned.

As described above, the internal combustion engine of the present invention can select and change the open and close timing of the valve 113 so that the ignition timing can be controlled in optimum.

Further, since the open and close timing of the valve 110 can be controlled, the feeding time of fuel can be also controlled and the fuel and air are premixed and preheated to be sufficiently activated in the fuel activation chamber 103. Accordingly, various fuel can be gasified to optimum state suitable for various internal combustion engines.

Thus, various fuel can be employed and the present invention can be applied to the whole internal combustion engine (not limited to the diesel engine and including the general petrol engine).

(3) Premix combustion by activation

The fuel is previously activated in the fuel activation chamber 103 before ignition and accordingly there is no diesel knocking particular to the diesel combustion. A quiet premix combustion can be achieved with less exhaust gas and particularly black smoke is not almost produced. Accordingly, since the engine can be operated at a high speed rotation and the compression ratio thereof can be reduced slightly, the weight of the engine can be reduced. Further, the excess coefficient can approach 1.0 and accordingly the output power of the engine can be improved.

Figure 11:
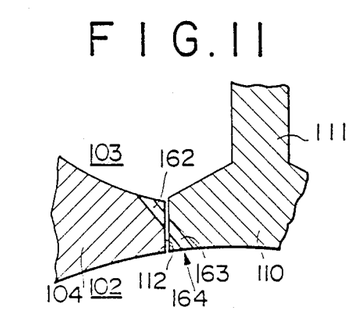
FIG. 11 is an enlarged cross-section view showing part of the internal combustion engine.

In the embodiment, the valve seat 112 and the valve body 110 are provided with the notches 148 and 149, respectively, while the present invention is not limited thereto and holes 162 and 163 may be formed in addition to the notches 148 and 149 as shown in FIG. 11 so that a compressed air injection hole 164 may be formed by overlap of the holes 162 and 163.

Further, the compressed air injection hole may be formed by combination of a notch and a hole. Namely, the compressed air injection hole may be formed with any form if the cross-section of the compressed air injection hole can be changed by shifting the valve body with respect to the valve seat.

In the embodiment, the valve body is angularly moved to change the cross-section of the compressed air injection hole, while the valve body may be shifted slightly in the axial direction. In this case, a notch and a hole may be formed in the valve seat and the valve body so that the compressed air injection hole is formed.

In this case, a device for shifting the valve body in its axial direction can be configured easily using a conventional technique such as a moving force of the control rack and accordingly detailed description thereof is omitted.

Furthermore, in the present invention, a drive source for shifting the valve body is not limited to the control rack and may be a various power producing device which detects an angular movement of the accelerator pedal or a negative pressure in the intake pipe to be operated.

In addition, as in the embodiment, a device for angularly moving the valve body may be composed of a gear capable of coupling with the rod 11 using a spline in place of the block 123 and a rack provided in a straight moving member such as the control rack.

In the present invention, the holder 4 may be disposed to be positioned at the center of the piston 106.

The shape of the cavity 107 of the piston 106 is not limited to a substantial semispherical shape and may be any shape such as a substantially cylindrical shape and the like.

Furthermore, any one or ones of the grooves 131 and 132 of the valve body 110, the air quantity adjusting device 126, the groove 135 of the piston 106 and the compressed air feeding device 138 may be removed and may be provided selectively in consideration of application of the internal combustion engine 101.

In addition, since the wall surface of the fuel activation chamber 103 or the whole of the holder 104 is formed of ceramic material, it is preferable that the thermal efficiency of the internal combustion engine can be improved. It is a matter of course that the whole of the engine may be formed of ceramic material together with the cylinder block 108 and the cylinder block 133.

In the embodiment, while it is configured that the main combustion chamber 102 communicates with the halfway position of the fuel feeding hole 118 through the compressed air introducing hole 119, the present invention is not limited thereto and it may be configured that the halfway positions of the respective holes are joined with each other.

As described above, the internal combustion engine according to the present invention including the fuel activation chamber disposed near the main combustion chamber and the valve disposed between the fuel activation chamber and the main combustion chamber to open and close therebetween is structured to open the valve by movement of the valve body to the fuel activation chamber side. Accordingly, when the valve is opened, the mixture in the fuel activation chamber can be injected into the main combustion chamber while the valve body squishes the mixture in the fuel activation chamber. Further, in the injection of the mixture, since the valve body can not prevent the flow of the mixture, the injection of the mixture is made smoothly and rapidly. Accordingly, the internal combustion engine of the present invention can attain extremely good combustion with less diesel knocking, is suitable for the high speed operation and can produce high output power.

Further, according to the internal combustion engine of the present invention, the fuel is premixed and activated in the high pressure and high temperature in the fuel activation chamber and the fuel can be ignited exactly using the ignition plug. Accordingly, the combustion efficiency can be increased even in the increased or decreased state of the compression ratio as compared with the conventional internal combustion engine, particularly the compression ignition engine. Consequently, black smoke and nitrogen oxide (Nox) can be reduced and air pollution due to exhaust of the black smoke and nitrogen oxide can be prevented. In addition, generation of the diesel knocking can be prevented and the acceleration performance can be improved while preventing the exhaust of much black smoke in the acceleration state or the loaded state.

In the present invention, since the ignition is made using the ignition plug and the fuel injected from the fuel injection nozzle can be exactly burned, various fuel can be used and the combustion can be performed smoothly even if a small quantity of fuel is set. Accordingly, the fuel consumption can be improved.

Furthermore, in the present invention, since the compressed air introducing hole is provided which leads the compressed air in the main combustion chamber to the fuel feeding hole and the fuel injected from the fuel injection nozzle is premixed in the fuel feeding hole to facilitate the activation thereof before the fuel is injected into the fuel activation chamber, the ignition and combustion in the engine can be performed exactly and smoothly. In addition, since the fuel can be activated in a high pressure and a high temperature in the fuel activation chamber, the combustion efficiency can be increased in the increased state or the decreased state of the compression ratio as compared with the conventional internal combustion engine, particularly the compression ignition engine. Accordingly, black smoke and nitrogen oxide (Nox) can be reduced and air pollution due to exhaust of the black smoke and nitrogen oxide can be prevented. Further, generation of the diesel knocking can be prevented and the acceleration performance can be improved while preventing the exhaust of much black smoke in the acceleration state or the loaded state.

In the present invention, various fuel can be used and the fuel can be burned smoothly.

Furthermore, in the present invention, the fuel activation chamber is formed in the holder formed separately from the cylinder head, and the holder fitted hole provided with the step at the substantially center portion thereof is formed in the cylinder block eccentrically with respect to the main combustion chamber to the extent that part of the hole overlaps the internal periphery of the cylinder block. Further, the holder is formed with the step corresponding to the step of the hole and when the holder is fitted into the hole the holer is fixed by the step of the hole of the cylinder head and the internal periphery of the cylinder block. Accordingly, since any fixing device such as a bolt is not required in order to fix the holder to the cylinder head, the fixing structure of the holder is simplified and the number of parts necessary for the fixing structure can be reduced. Consequently, design and fabrication or assembly of the internal combustion engine are simplified and the economical engine can be provided.

In addition, the internal combustion engine of the present inventinon including the fuel activation chamber disposed near the main combustion chamber and the valve disposed between the fuel activation chamber and the main combustion chamber to open and close therebetween comprises the valve control device which controls to open and close the valve at the ignition timing at the low speed operation and controls to maintain the valve open at the medium and high speed operation. Accordingly, the fuel previously activated in the fuel activation chamber can be ignited exactly and smoothly in the range between the low speed operation and the medium speed operation to thereby prevent knocking in the range between the low speed operation and the medium speed operation, and smooth operation can be effected in the range between the medium and high speed operation.

Furthermore, since the fuel can be activated in a high prssure and a high temperature in the fuel activation chamber, the combustion efficiency can be increased in the decreased state or the increased state of the compression ratio as compared with the cnventional internal combustion engine, particularly the compressioon ignition engine. Accordingly, black smoke and nitrogen oxide (Nox) can be reduced and air pollution due to exhaust of black smoke and nitrogen oxide can be prevented.

Moreover, in the present invention, since the compressed air injection hole which can change the flow rate of the compressed air in accordance with the operation condition is provided in the valve disposed between the main combustion chamber and the fuel activation chamber, sufficient compressed air can be always injected into the fuel activation chamber in any operation condition and accordingly the ignition and combuston in the internal combustion engine can be effected exactly and smoothly. In addition, since the fuel can be activated in a high pressure and a high temperature in the fuel activation chamber, the combustion efficiency can be increased in the decreased state or the increased state of the compression ratio as compared with the conventional internal combustion engine, particularly the compression ignition engine. Accordingly, black smoke and nitrogen oxide (Nox) can be reduced and air pollution due to exhaust of black smoke and nitrogen oxide can be prevented. Further, generation of the diesel knocking can be prevented and the acceleration performance can be improved while preventing exhaust of much black smoke in the acceleration state or the loaded state.

In the present invention, since a sufficient quantity of compressed air can be always injected into the fuel activation chamber, fuel of many kinds can be used and can be burned smoothly.

We claim:

1. An internal combustion engine comprising a fuel activation chamber disposed near a main combustion chamber and a valve disposed between said fuel activation chamber and said main combustion chamber to open and close therebetween, and valve control means for opening and closing said valve at an ignition timing in a low speed operation and maintaining said valve open in a medium and high speed operation.

2. An internal combustion engine according to claim 1, wherein said valve is opened by movement of a valve body of said valve to said fuel activation chamber side.

3. An internal combustion diesel engine comprising a fuel activation chamber disposed near a main combustion chamber and a valve disposed between the fuel activation chamber and the main combustion chamber to open and close therebetween, said valve being opened by movement of a valve body of said valve to said fuel activaton chamber side, a fuel feeding hole from which fuel is injected into said fuel activation chamber and a compressed air introducing hole for leading the compressed air from said main combustion chamber into said fuel activation chamber are joined to each other at respective intermediate positions so that the compressed air from said main combustion chamber and fuel injected from a fuel injection nozzle are premixed to be injected into said fuel activation chamber.

4. An internal combustion engine according to claim 3, wherein said fuel feeding hole and said compressed air introducing hole are formed eccentrically with respect to said fuel activation chamber so that a swirl occurs in said fuel activation chamber.

5. An internal combustion engine according to claim 4, wherein a glow plug is exposed in said fuel activation chamber.

6. An internal combustion engine according to claim 3, wherein a compressed air feeding device feeds a compressed air into said fuel activation chamber according to an operation condition of the engine.

7. An internal combustion engine according to claim 3, wherein an air quantity adjusting device supplements a quantity of compressed air fed from said main combustion chamber to said fuel activation chamber according to an operation condition of the engine.

8. An internal combustion engine according to claim 3, wherein annular grooves are formed in at least a side periphery of said valve body.

9. An internal combustion engine according to claim 3, wherein a piston of said engine is formed with guide grooves extending from a cavity thereof.

10. An internal combustion engine according to claim 3, wherein an ignition plug is exposed in said fuel activation chamber.

11. An internal combustion diesel engine comprising a fuel activation chamber disposed near a main combustion chamber and a valve disposed between the fuel activation chamber and the main combustion chamber to open and close therebetween, said valve being opened by movement of a valve body of said valve to said fuel activation chamber side, said fuel activation chamber being formed in a holder formed separately from a cylinder head and a hole provided with a step at a substantially central portion thereof and into which said holder is fitted is formed in said cylinder head eccentrically with respect to said main combustion chamber to an extent that part of said hole overlaps an inner periphery of a cylinder block, said holder being formed with a step corresponding to the step of said hole, said holder being fixed by the step of said hole of said cylinder head and the inner periphery of said cylinder block when said holder is fitted into said hole.

12. An internal combustion engine comprising a fuel activation chamber disposed near a main combustion chamber and a valve disposed between the fuel activation chamber and the main combustion chamber to open and close therebetween, said valve being opened by movement of a valve body of said valve to said fuel activation chamber side, a valve body adjusting means provided for shifting said valve body in a radial direction or an axial direction thereof in accordance with an operation condition, a pair of notches formed in said valve body and a valve seat of said valve, respectively, and which overlap each other in accordance with a shifted amount of said valve body by said valve body adjusting means, and a compressed air injection hole formed in said valve body by the overlap of said pair of notches to inject the compressed air in said main combustion chamber into said fuel activation chamber so that the compressed air of an amount in accordance with said operation condition is introduced into said fuel activation chamber through said compressed air injection hole.

13. An internal combustion engine according to claim 12, wherein said compressed air injection hole is formed by holes which are respectively formed in said valve body and said valve seat of said valve.

14. An internal combustion engine comprising a fuel activation chamber disposed near a main combustion chamber and a valve disposed between said fuel activation chamber and said main combustion chamber to open and close therebetween, and valve control means for opening and closing said valve at an ignition timing in a low speed operation and maintaining said valve open in a medium and high speed operation.

15. An internal combustion engine according to claim 14, wherein said valve is opened by movement of a valve body of said valve to said fuel activation chamber side.

16. An internal combustion engine comprising a fuel activation chamber disposed near a main combustion chamber and a valve disposed between the fuel activation chamber and the main combustion chamber to open and close therebetween, said valve being opened by movement of a valve body of said valve to said fuel activation chamber side, said fuel activation chamber being formed in a holder formed separately from a cylinder head and a hole provided with a step at a substantially central portion thereof and into which said holder is fitted is formed in said cylinder head eccentrically with respect to said main combustion chamber to an extent that part of said hole overlaps an inner periphery of a cylinder block, said holder being formed with a step corresponding to the step of said hole, said holder being fixed by the step of said hole of said cylinder head and the inner periphery of said cylinder block when said holder is fitted into said hole.

* * * * *